United States Patent
Yoshida et al.

(10) Patent No.: US 9,919,580 B2
(45) Date of Patent: Mar. 20, 2018

(54) AIR CONDITIONER FOR VEHICLE

(71) Applicants: DENSO CORPORATION, Kariya, Aichi-pref. (JP); TOYOTA JIDOSHA KABUSHIKI KAISHA, Toyota-shim Aichi-ken (JP)

(72) Inventors: Hiroyuki Yoshida, Kariya (JP); Masashi Watanabe, Kariya (JP); Hidekazu Hirabayashi, Chiryu (JP)

(73) Assignees: DENSO CORPORATION, Kariya, Aichi-perf. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 92 days.

(21) Appl. No.: 14/901,674

(22) PCT Filed: Jun. 19, 2014

(86) PCT No.: PCT/JP2014/003289
§ 371 (c)(1),
(2) Date: Dec. 28, 2015

(87) PCT Pub. No.: WO2015/001743
PCT Pub. Date: Jan. 8, 2015

(65) Prior Publication Data
US 2016/0137024 A1    May 19, 2016

(30) Foreign Application Priority Data
Jul. 2, 2013 (JP) ................. 2013-139245

(51) Int. Cl.
*B60H 1/00* (2006.01)
*B60H 1/32* (2006.01)

(52) U.S. Cl.
CPC ........... *B60H 1/0075* (2013.01); *B60H 1/004* (2013.01); *B60H 1/00885* (2013.01);
(Continued)

(58) Field of Classification Search
CPC .......... B60H 2001/3272; B60H 1/0075; B60H 1/004; B60H 1/00885; B60H 1/3208; B60H 1/3211; B60H 1/3222; B60H 2001/3266
See application file for complete search history.

(56) References Cited

U.S. PATENT DOCUMENTS 5,709,098 A * 1/1998 Itoh ...................... B60H 1/3213
                                                          62/228.4
5,884,497 A   3/1999 Kishita et al.
(Continued)

FOREIGN PATENT DOCUMENTS

JP    S58-101281    6/1983
JP    S58096935 A   6/1983
(Continued)

OTHER PUBLICATIONS

JP2006112700 translation.*
(Continued)

*Primary Examiner* — Len Tran
*Assistant Examiner* — Gordon Jones
(74) *Attorney, Agent, or Firm* — Harness, Dickey & Pierce, P.L.C.

(57) ABSTRACT

An air conditioner for a vehicle includes: a compressor that compresses refrigerant for conditioning air in a vehicle cabin and defines a refrigeration cycle; a detecting section that detects a thermal load of air-conditioning in the vehicle cabin; and a control section that controls a rotational speed of the compressor such that the thermal load detected by the detecting section satisfies a predetermined air conditioning request in the vehicle cabin. In case where the air conditioning request is satisfied by controlling the rotational speed of the compressor, the control section periodically switches between a reference rotational speed and a low rotational speed that is lower than the reference rotational speed in (Continued)

order to maintain a state where the air conditioning request is satisfied. The reference rotational speed is a rotational speed within a predetermined range that includes the rotational speed at which the air conditioning request is satisfied.

9 Claims, 5 Drawing Sheets

(52) U.S. Cl.
CPC ......... B60H 1/3208 (2013.01); B60H 1/3211 (2013.01); B60H 1/3222 (2013.01); *B60H 2001/3266* (2013.01); *B60H 2001/3272* (2013.01)

(56) References Cited

U.S. PATENT DOCUMENTS

| | | | |
|---|---|---|---|
| 6,330,909 | B1 | 12/2001 | Takahashi et al. |
| 2004/0079096 | A1* | 4/2004 | Itoh ................... B60H 1/00735 62/223 |
| 2004/0172959 | A1* | 9/2004 | Oomura ............... B60H 1/3205 62/228.1 |
| 2004/0206102 | A1* | 10/2004 | Homan .................. B60H 1/322 62/228.1 |
| 2007/0130973 | A1* | 6/2007 | Lifson .................. B60H 1/3216 62/196.3 |

FOREIGN PATENT DOCUMENTS

| | | |
|---|---|---|
| JP | H02267445 A | 11/1990 |
| JP | 2002036868 A | 2/2002 |
| JP | 2003127655 A | 5/2003 |
| JP | 2004243812 A | 9/2004 |
| JP | 2004332710 A | 11/2004 |
| JP | 2006112700 A | 4/2006 |
| JP | 2008081121 A | 4/2008 |
| JP | 2010030326 A | 2/2010 |
| JP | 2010100264 A | 5/2010 |

OTHER PUBLICATIONS

International Search Report and Written Opinion (in Japanese with English Translation) for PCT/JP2014/003289, dated Sep. 22, 2014; ISA/JP.

* cited by examiner

AIR CONDITIONER FOR VEHICLE

CROSS REFERENCE TO RELATED APPLICATIONS

This application is a U.S. National Phase Application under 35 U.S.C. 371 of International Application No. PCT/JP2014/003289 filed on Jun. 19, 2014 and published in Japanese as WO 2015/001743 A1 on Jan. 8, 2015. This application is based on and claims the benefit of priority from Japanese Patent Application No. 2013-139245 filed on Jul. 2, 2013. The entire disclosures of all of the above applications are incorporated herein by reference.

TECHNICAL FIELD

The present disclosure relates to an air conditioner for a vehicle.

BACKGROUND ART

In an air conditioner for a vehicle described in PTL 1, an evaporator is arranged in an air conditioning case, and cools air to be blown into a vehicle cabin. In addition, a bypass passage is formed, through which air bypasses the evaporator. By forming the bypass passage, an air volume that passes through the evaporator can be reduced by an air volume that passes through the bypass passage. In this way, the air volume that passes through the evaporator to be cooled and the air volume that passes through the bypass passage not to be cooled can be adjusted in accordance with a requested temperature. Thus, drive power of a compressor can be saved by lowering the required cooling capacity of the evaporator.

PRIOR ART LITERATURES

Patent Literature

PTL 1: JP 2008-81121 A

SUMMARY OF INVENTION

In case where economical air conditioning control is executed to save fuel consumption, methods of raising a target post-evaporator temperature (a target value of a temperature of the air immediately after passing through the evaporator), lowering a rotational speed of the compressor, reducing the air volume, and the like have been known. However, these methods lower air conditioning capacity, and comfort of an occupant is sacrificed. In addition, control for securing air conditioning performance and quality is executed in background art. Accordingly, there is a case where the performance is excessive in an environment where the air conditioning performance and quality do not have to be secured. Thus, the control in the background art is not necessarily optimum control for saving the fuel consumption.

The present disclosure has a purpose of providing an air conditioner for a vehicle that can save power by controlling a rotational speed of a compressor while restricting an influence on air conditioning performance.

According to an aspect of the present disclosure, an air conditioner for a vehicle includes: a compressor that compresses refrigerant for conditioning air in a vehicle cabin and defines a refrigeration cycle for the vehicle; a detecting section that detects a thermal load of air-conditioning in the vehicle cabin; and a control section that controls a rotational speed of the compressor such that the thermal load detected by the detecting section satisfies a predetermined air conditioning request in the vehicle cabin. In case where the predetermined air conditioning request is satisfied by controlling the rotational speed of the compressor, the control section periodically switches between a reference rotational speed and a low rotational speed that is lower than the reference rotational speed so as to maintain a state where the air conditioning request is satisfied. The reference rotational speed is a rotational speed within a predetermined range that includes the rotational speed at which the air conditioning request is satisfied.

According to the present disclosure, when the air conditioning request is satisfied, the reference rotational speed and the low rotational speed that is lower than the reference rotational speed are periodically switched by the control section. In this way, compared to a case where the compressor is controlled to be constantly operated at the reference rotational speed in order to maintain the air conditioning request, power can be reduced by a time in which the compressor is operated at the low rotational speed. The rotational speed is periodically controlled in order to maintain the air conditioning request. Thus, power can be saved while an influence on air conditioning performance is restricted.

DESCRIPTION OF EMBODIMENTS

First Embodiment

A description will be made on a first embodiment of the present disclosure by using FIG. 1 to FIG. 6. An air conditioner 10 of this embodiment is for a vehicle and is mounted in a hybrid vehicle. The air conditioner 10 of this embodiment includes a refrigeration cycle, and an electric compressor 11 that is driven by an electric motor 12 mounted in the vehicle is adopted as the compressor 11 as a component of the refrigeration cycle. Electric power is supplied from an onboard battery 13 to the electric motor 12, which is thereby driven.

The refrigeration cycle is configured by including: a condenser for condensing and liquefying a high-temperature, high-pressure refrigerant that has been compressed by the electric compressor 11; a receiver for performing gas-liquid separation of the refrigerant that has been condensed and liquefied; an expansion valve for lowering pressure of and expanding a liquid refrigerant from the receiver; and an evaporator for evaporating and gasifying a low-temperature, low-pressure refrigerant that has been expanded, in addition to the electric compressor 11.

In addition, the air conditioner 10 of this embodiment includes an air conditioning unit for supplying conditioned air into a vehicle cabin. In an air conditioning case, the air conditioning unit has a blower 14, the evaporator, a heater core, an inlet switch door 15 as an inside/outside air suction mode switching section, an air-mix door 16 as a temperature adjusting section, an outlet switch door 17 that switches to open or close plural blowoff ports from which the air is blown toward an inner surface of a front windshield in the vehicle cabin, an upper half body of the occupant, and a lower half body of the occupant, and the like.

Figure 1:
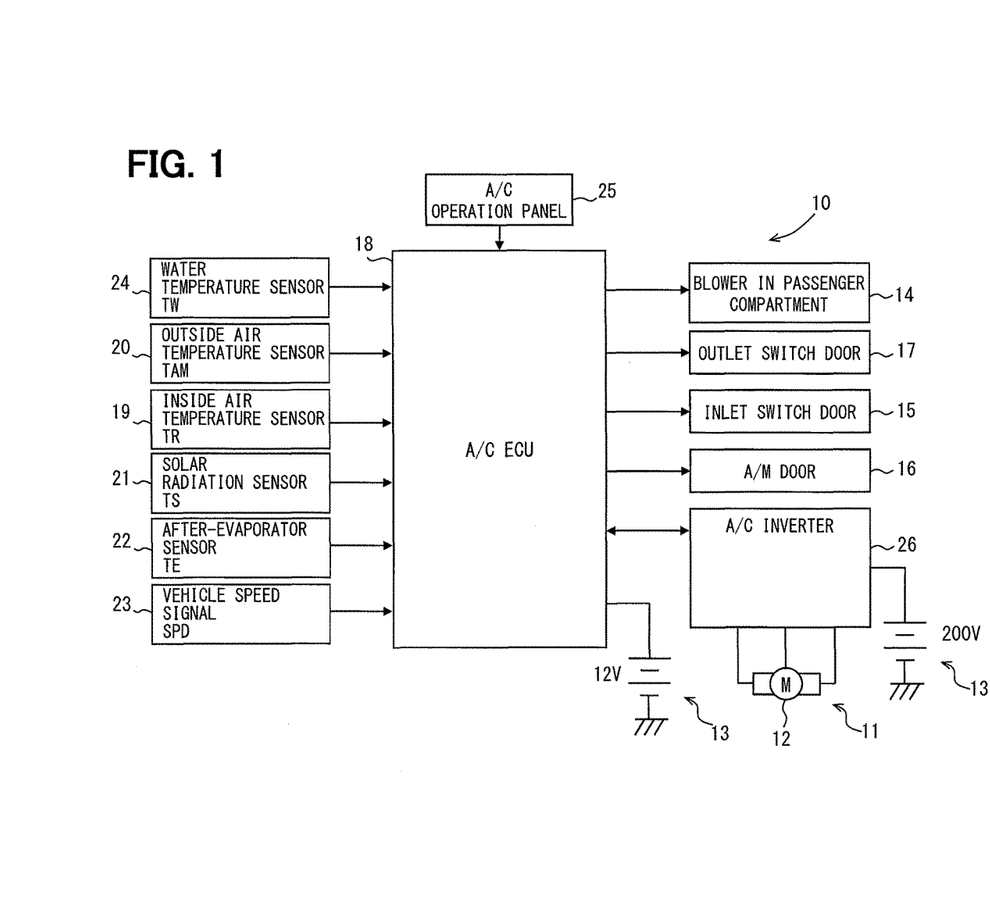
FIG. 1 is a block diagram illustrating a control system of an air conditioner for a vehicle.

Next, a configuration of a control system of the air conditioner 10 will be described with reference to FIG. 1. The air conditioner 10 includes an air conditioning ECU 18 as a computing section that includes a CPU, a ROM, a RAM, and the like that are not depicted. The air conditioning ECU 18 is a control section, and is supplied with the electric power from the onboard battery 13 and brought into an activated state when an ignition switch as a vehicle travel switch is turned ON.

The air conditioning ECU 18 receives signals from an inside air temperature sensor 19 for detecting a vehicle cabin inside temperature Tr, an outside air temperature sensor 20 for detecting an outside air temperature Tam, a solar radiation sensor 21 for detecting a solar radiation amount Ts that is irradiated on the inside of the vehicle cabin; an after-evaporator sensor 22 for detecting a temperature of the air immediately after passing through the evaporator (hereinafter referred to as a post-evaporator temperature TE), a vehicle speed sensor 23 for detecting a vehicle speed Spd, a water temperature sensor 24 for detecting an engine coolant temperature Tw as a heat source of the heater core, and the like.

In addition, the air conditioning ECU 18 receives signals from an operation panel 25 and the like on a dashboard. The operation panel 25 includes a temperature setter for setting a target temperature of the inside of the vehicle cabin, an air conditioner switch that is used to instruct activation of the electric compressor 11, and the like.

Furthermore, a rotational speed of the electric motor 12 is controlled by an inverter 26, and actuation of the inverter 26 is controlled by the air conditioning ECU 18. More specifically, the air conditioning ECU 18 outputs a rotational speed instruction value to the inverter 26, and the inverter 26 executes rotational speed control such that the electric motor 12 obtains a rotational speed of the rotational speed instruction value. It should be noted that, in addition to a rotational speed instruction value signal, an activation signal for permitting actuation of the inverter 26 is output from the air conditioning ECU 18 to the inverter 26.

Figure 2:
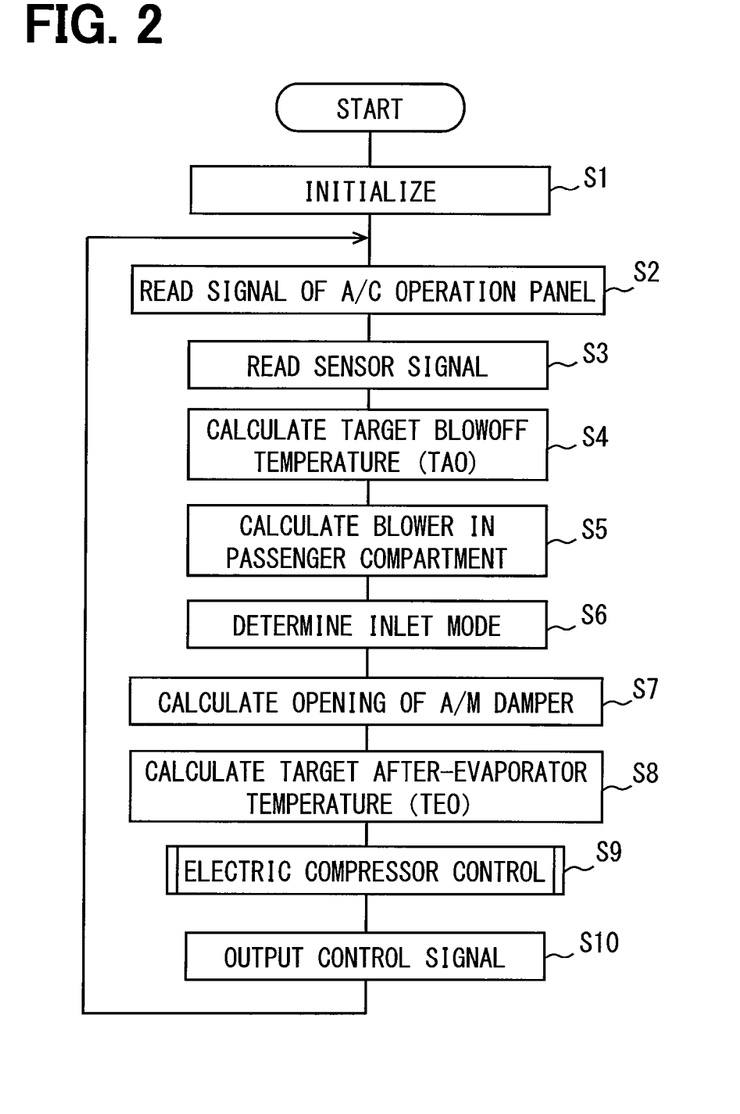
FIG. 2 is a flowchart illustrating a control routine that is executed by an air conditioning ECU.

Next, a control routine by the air conditioning ECU 18 will be described using FIG. 2. A process depicted in FIG. 2 is activated when the ignition switch is turned ON.

Various set values are initialized in S1, and the process proceeds to S2. Various signals from the operation panel 25 are read in S2, and the process proceeds to S3. Signals from the various sensors are read in S3, and the process proceeds to S4. A target blowoff temperature TAO is computed on the basis of a set temperature Tset, the outside air temperature Tam, the vehicle cabin inside temperature Tr, and the solar radiation amount Ts in S4, and the process proceeds to S5.

A blower air volume is computed on the basis of the computed target blowoff temperature TAO in S5, and the process proceeds to S6. An inlet mode is determined in S6, and the process proceeds to S7. An opening degree of the air-mix door 16 is computed in S7, and the process proceeds to S8. A target post-evaporator temperature TEO that is a target value of the post-evaporator temperature TE is computed in S8, and the process proceeds to S9. Fuzzy control is executed in S9 such that the post-evaporator temperature TE becomes the target post-evaporator temperature TEO, and the rotational speed of the electric compressor 11 is controlled by the inverter 26 with an instruction from the air conditioning ECU 18. Then, the process proceeds to S10.

In S10, various actuators, such as a servomotor, for driving the blower 14, the inlet switch door 15, the air-mix door 16, and the outlet switch door 17 are driven on the basis of the values that are computed or determined in S5 to S8. Then, the process returns to S2.

Figure 3:
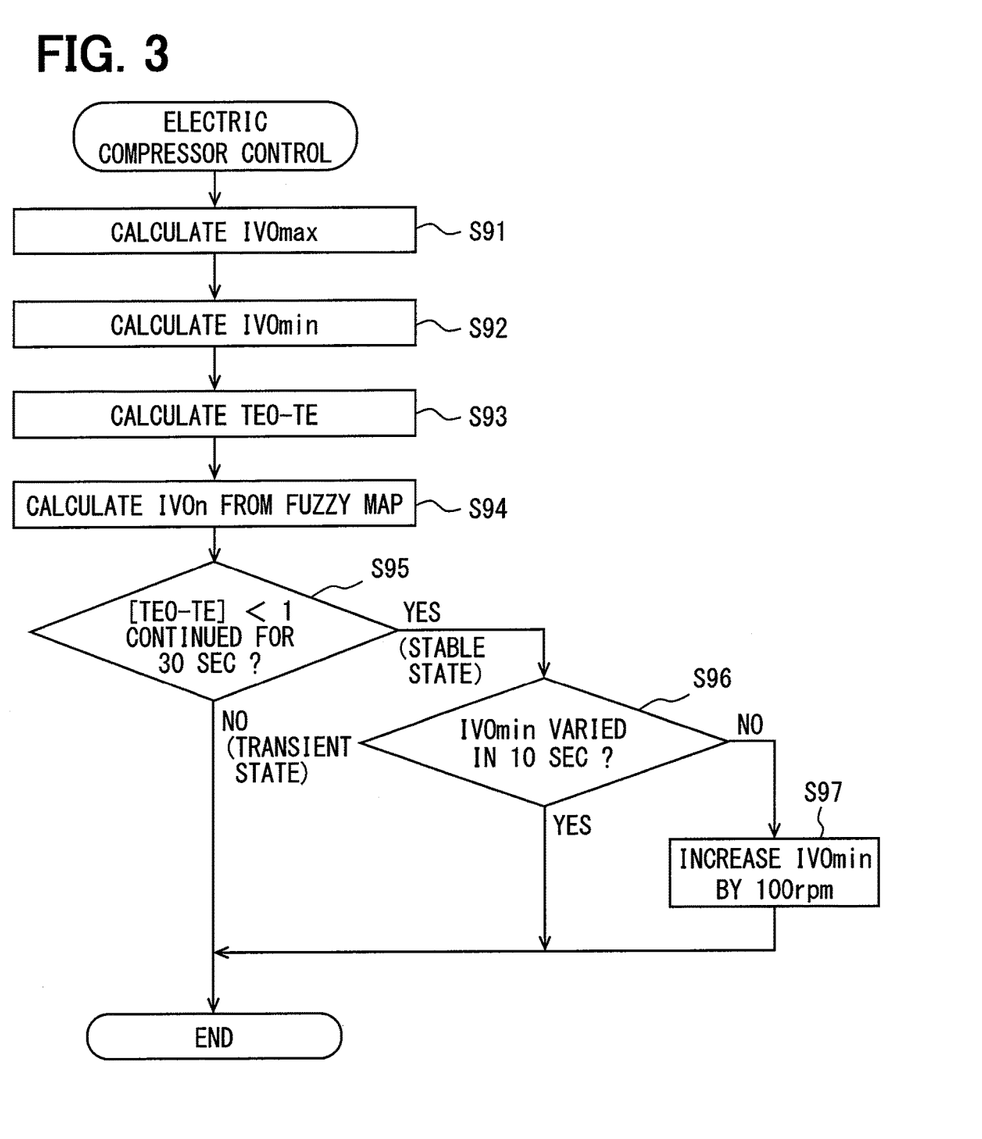
FIG. 3 is a flowchart illustrating a control of a compressor.

Next, control of the electric compressor 11 will be described using FIG. 3. A process depicted in FIG. 3 is started when S8 is terminated in FIG. 2.

An upper limit control value IVOmax of a target compressor rotational speed is computed in S91, and the process proceeds to S92. The upper limit control value IVOmax is a value at which an air conditioning request is satisfied, and is set to derive a rotational speed at which a vibration of the compressor 11 and noise from the compressor 11 become lower than predetermined values. A lower limit control value IVOmin of the target compressor rotational speed is computed in S92, and the process proceeds to S93. The lower limit control value IVOmin is set as a minimum value for operating the compressor 11 in consideration of returning of oil of the compressor 11 and the like. A difference between the target post-evaporator temperature TEO and the detected post-evaporator temperature TE is computed in S93, and the process proceeds to S94.

A target compressor rotational speed IVOn is computed from a fuzzy map that is stored in advance in S94, and the process proceeds to S95. It is determined in S95 whether a state where the value computed in S93 is smaller than 1 continues for at least 30 seconds. If the state continues, the process proceeds to S96. If not, this flow is terminated. Accordingly, if the state does not continue for at least 30 seconds, it is a transient period in which an air conditioning load is unstable. Thus, the compressor 11 is controlled to be operated at the target compressor rotational speed.

Since the state determined in S95 continues for at least 30 seconds, it is determined as a stable state. Thus, in S96, it is determined whether the lower limit control value IVOmin of the target compressor rotational speed is varied within 10 seconds. If the lower limit control value IVOmin is varied, this flow is terminated. If the lower limit control value IVOmin is not varied, the process proceeds to S97. If the lower limit control value IVOmin is varied within 10 seconds, it is still determined as the transient period in which the air conditioning load is unstable. Thus, the compressor 11 is controlled to be operated at the target compressor rotational speed. As described above, it is determined in S96 whether a state where a thermal load and the refrigeration cycle are stably balanced and thus the air conditioning performance is sufficiently satisfied continues. In this way, deterioration of required performance is prevented during the following transition to ON/OFF control.

In S97, the lower limit control value IVOmin is increased by 100 rpm, and this flow is terminated. Just as described, the lower limit control value IVOmin is increased stepwise by 100 rpm by S97 when the stable state is achieved. In this way, compared to a case where the lower limit control value IVOmin is abruptly increased, safety can be improved. In addition, a maximum value of the lower limit control value IVOmin is preferably a lower value by a specified value than the upper limit control value IVOmax, for example, −500 rpm such that controllability is not degraded by approximation of the lower limit control value IVOmin and the upper limit control value IVOmax. Thus, in the case where the upper limit control value IVOmax is 2000 rpm, for example, the maximum value of the lower limit control value IVOmin is set at 1500 rpm.

Then, the compressor 11 is controlled on the basis of the upper limit control value IVOmax, the target compressor rotational speed IVOn, and the lower limit control value IVOmin that are determined in S9.

In this way, [TEO-TE] that is used in the fuzzy control is monitored. If [TEO-TE]<1 continues for 30 seconds, it is determined that the thermal load and the refrigeration cycle are stably balanced (S95). Then, the minimum rotational speed is increased by 100 rpm/10 seconds, and the control is shifted to the optimum ON/OFF power saving control in accordance with the thermal load in S96 and S97. Thus, in the case where comfortability and dehumidifying performance are secured, an ON/OFF operation (the rotational speed control) of the compressor 11 is actively executed, and an operation rate of the compressor 11 is thus lowered. In this way, power saving control can be realized.

Figure 4:
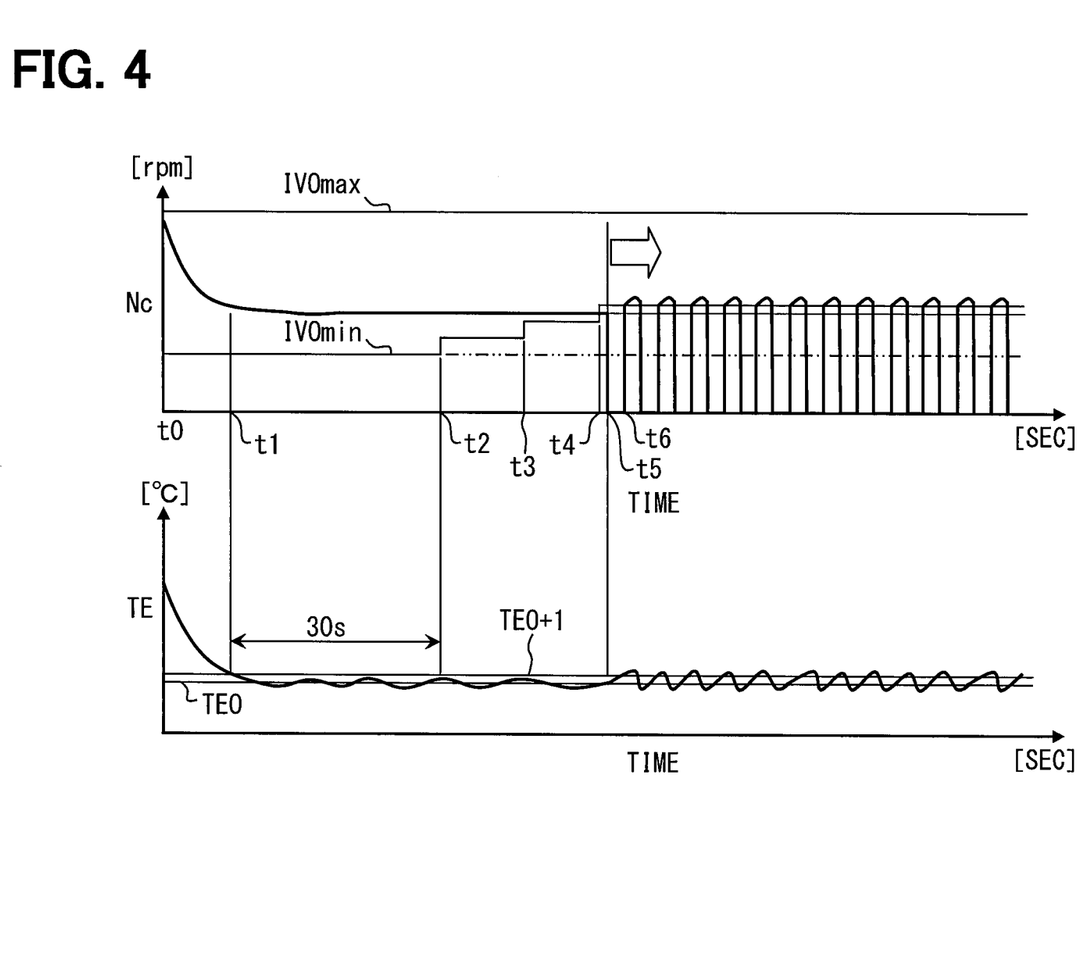
FIG. 4 is a graph illustrating a rotational speed Nc of the compressor and a post-evaporator temperature TE with time progression.

The specific control of the compressor 11 will be described using FIG. 4. As depicted in FIG. 4, the post-evaporator temperature TE is significantly higher than the target post-evaporator temperature TEO at time t0. Accordingly, the compressor 11 is activated to compress refrigerant, and a rotational speed Nc is controlled such that the post-evaporator temperature TE approximates the target post-evaporator temperature TEO.

Then, the difference between the target post-evaporator temperature TEO and the post-evaporator temperature TE becomes smaller than 1 at time t1. Thus, the rotational speed Nc is stabilized. Next, at time t2, the state where the difference between TEO and TE is smaller than 1 continues for at least 30 seconds, and furthermore, the lower limit control value IVOmin is not changed within 10 seconds. Accordingly, the lower limit control value IVOmin is increased by 100 rpm. Then, at time t3, the state where the difference between TEO and TE is smaller than 1 continues for at least 30 seconds, and furthermore, the lower limit control value IVOmin is not changed within 10 seconds. Accordingly, the lower limit control value IVOmin is further increased by 100 rpm. Similarly, at time t4, the state where the difference between TEO and TE is smaller than 1 continues for at least 30 seconds, and furthermore, the lower limit control value IVOmin is not changed within 10 seconds. Accordingly, the lower limit control value IVOmin is further increased by 100 rpm.

The lower limit control value IVOmin becomes higher than the rotational speed Nc of the compressor 11 at the time t4. Accordingly, the compressor 11 is controlled to be stopped. When the compressor 11 is stopped, the compression of the refrigerant is stopped. Accordingly, the post-evaporator temperature TE is increased, and the difference between TEO and TE becomes at least equal to 1 at time t5. Thus, at the time t5, the compressor 11 is activated again at a higher value higher than the lower limit control value IVOmin and is thereby controlled to lower TE. Then, when the difference between TEO and TE becomes smaller than 1 again at time t6, the compressor 11 is controlled to be stopped. In the case where the air conditioning request is satisfied just as described, the compressor 11 is periodically turned ON and OFF.

In a conventional art, as depicted by a phantom line in FIG. 4, the lower limit control value IVOmin is a constant value. Meanwhile, in this embodiment, when a state where the air conditioning request is satisfied continues, the lower limit control value IVOmin is increased stepwise. In this way, the ON/OFF control of the compressor 11 is realized.

Next, a power saving effect obtained by the power saving control will be described using Table 1. Table 1 depicts an average post-evaporator temperature, cooling performance, the consumed electric power, and the power saving effect in the case where the minimum rotational speed is set in five steps and the operation rate of the compressor 11 is changed. Table 1 depicts results of experiments in the case where suction air has temperature of 30° C., humidity of 40%, and air volume of 160 m³/h.

TABLE 1

| Minimum rotational speed (rpm) | 1345 | 1350 | 1540 | 1900 | 2200 |
|---|---|---|---|---|---|
| Operation rate (%) | 100.0 | 60 | 57 | 53 | 51 |
| Average post-evaporator temperature (° C.) | 9.4 | 9.8 | 9.8 | 9.7 | 9.6 |
| Cooling performance (kW) | 1021 | 1021 | 1062 | 1147 | 1195 |
| Consumed power (kW) | 240 | 168 | 187 | 201 | 209 |
| Power saving effect (%) | — | 30 | 22 | 16 | 13 |

As depicted in Table 1, when the minimum rotational speed is the lowest of 1345, the operation rate is 100%. With this example being a reference, when the minimum rotational speed is 1350, the power saving effect is 30% and is the highest. Accordingly, it can be understood that the minimum rotational speed (1350 rpm) at which the compressor is respectively turned ON/OFF is valid. In addition, although the power saving control is executed, the cooling performance is the same as the case of 1345 rpm. Thus, it can be understood that the power can be saved while the air conditioning request is satisfied. Furthermore, the optimum minimum rotational speed differs by a situation, such as a use environment condition, and differs, for example, by the outside air temperature, the solar radiation amount, the setting temperature, the suction mode, the vehicle speed, and the number of the occupants. Accordingly, the optimum minimum rotational speed may be increased stepwise as described above, may be determined uniformly by the fuzzy map or the like in advance, or may be increased stepwise on the basis of the minimum rotational speed that is determined by the fuzzy map.

As described above, the ON/OFF control is executed by increasing the lower limit control value IVOmin in the state where the air conditioning request is satisfied as described above. However, the ON/OFF control is not always executed in the state where the air conditioning request is satisfied. For example, in a situation where fogging of the front windshield is concerned, and in the case where it is determined that the cooling performance at least equal to a predetermined level is required, shifting to the above-described ON/OFF control (the power saving control) is not made.

Figure 5:
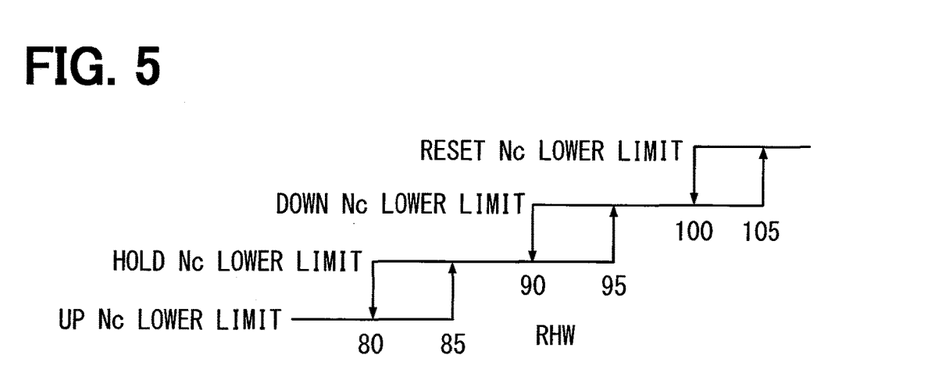
FIG. 5 is a chart illustrating a relationship between a relative humidity RHW and the rotational speed Nc of the compressor.

First, a description will be made on control in which fogging is concerned in order to prioritize antifogging performance using FIG. 5. RHW indicates a relative humidity in the vicinity of the front windshield with respect to a fogging limit. When RHW is increased, the fogging control is required. Thus, as depicted in FIG. 5, for example, when RHW is increased to 105% or higher, the lower limit control value IVOmin is reset, and the control is returned to normal continuous control in order not to execute the power saving control. Similarly, a state where the lower limit control value IVOmin is reset continues until RHW becomes lower than 100%.

In addition, when RHW is increased and exceeds 95%, the lower limit control value IVOmin is lowered, so as to control such that an ON state is extended while an OFF state is shortened. Similarly, a state where the lower limit control value IVOmin is lowered continues until RHW becomes lower than 90%.

When RHW is increased to exceed 85%, the lower limit control value IVOmin is maintained at a current value. Then, the power saving control is executed as it is considered that the fogging of the front windshield is less likely to occur even with the execution of the power saving control. Similarly, the lower limit control value IVOmin is maintained at the current value until RHW becomes lower than 80%. In addition, when RHW becomes at most equal to 80%, the lower limit control value IVOmin is increased and controlled so as to execute the power saving control.

FIG. 5 depicts the control at a time that a sensor for detecting RHW is mounted. When the sensor for detecting RHW is not provided, an occurrence situation of the fogging of the front windshield is predicted by using the temperatures of outside air and inside air, the vehicle speed, and the like, and similar control to that in FIG. 5 is executed.

Figure 6:
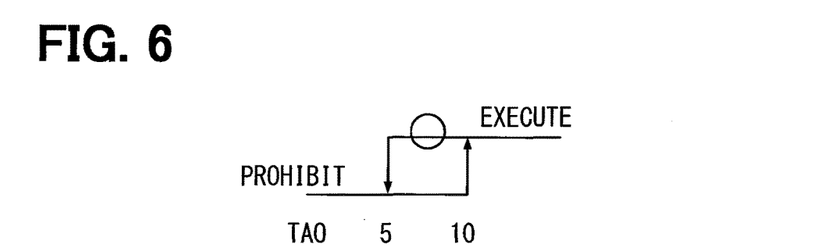
FIG. 6 is a chart illustrating a relationship between a target blowoff temperature TAO and power saving control.

Next, a description will be made on control for securing a sense of cooling and comfortability with reference to FIG. 6. As indicated in FIG. 6, when the target blowoff temperature TAO is lower than a predetermined value, for example, when TAO<5, the power saving control is prohibited. In other words, in order not to hinder the sense of cooling and the comfortability, when a cooling load is large, the power saving control is not executed. On the contrary, when the target blowoff temperature TAO≥5, it is determined that required cooling performance is low, and the shifting to the ON/OFF operation is made. In other words, in the case where the required cooling capacity for the refrigeration cycle is lower than the predetermined value, the shifting to the ON/OFF operation is made.

In case where the lower limit control value IVOmin is excessively increased, the lower limit control value IVOmin is lowered as follows. In order to maximize the power saving effect, the lower limit control value IVOmin is lowered when the cooling load is reduced, and the ON/OFF operation at the low rotational speed Nc is performed. (1) When TEO is increased by 1° C., the lower limit control value IVOmin is lowered by −300 rpm, and the continuous operation is performed once. Thereafter, the lower limit control value IVOmin is increased, and the optimum ON/OFF control is executed. (2) In case where a user manually reduces the air volume of the blower 14, similar to (1), the lower limit control value IVOmin is lowered at a ratio of −300 rpm/1 step. (3) When the load is reduced by the inside/outside air door, the increase or reduction in the load is predicted by the inside air temperature sensor 19, the outside air temperature sensor 20, the solar radiation sensor 21, and the after-evaporator temperature sensor 22, and the like, so as to compute a magnitude of reduction in the lower limit control value IVOmin.

As it has been described so far, in the air conditioner 10 of this embodiment, in the case where the air conditioning request is satisfied, the reference rotational speed (the lower limit control value) and the low rotational speed that is lower than the reference rotational speed (the low rotational speed is 0 in this embodiment) are periodically switched by the air conditioning ECU 18 (the control section). In this way, compared to the case where the compressor 11 is controlled to be constantly operated at the reference rotational speed in order to maintain the air conditioning request, the power can be reduced by the time for which the control to achieve the low rotational speed. Since the rotational speed is periodically controlled so as to maintain the air conditioning request, the power can be saved while the influence on the air conditioning performance is restricted.

In this embodiment, in the case where the air conditioning request is satisfied, the air conditioning ECU 18 periodically switches between the state where the compressor 11 is driven at the reference rotational speed and the state where the low rotational speed is 0, i.e., the compressor 11 is stopped. The power saving effect can further be increased by stopping the compressor 11.

Furthermore, in this embodiment, the lower limit control value as the reference of the power saving control is a rotational speed at which the vibration of the compressor 11 and the noise from the compressor 11 become lower than the predetermined values. In this way, the occurrence of the significant vibration and noise from the compressor 11, which is caused by the excessive increase in the lower limit control value, can be restricted.

Just as described, in this embodiment, the power saving control can be realized by actively executing the ON/OFF operation and the rotational speed control of the compressor 11 in a region that does not influence the air conditioning performance. In addition, the load (a sense of warmth by the occupant) in the vehicle cabin can accurately be grasped by using the after-evaporator temperature sensor 22 as the existing sensor. Accordingly, addition of a new sensor or the like is unnecessary to implement this embodiment, and thus the accurate and optimum control can be realized at low cost. More specifically, the stable state between the thermal load and the refrigeration cycle is determined from the difference between the target post-evaporator temperature TEO and the post-evaporator temperature TE in the fuzzy control, the minimum rotational speed of the compressor 11 is increased in the state, and the shifting to the ON/OFF operation (the rotational speed control) is made. As a result, the ON/OFF operation in which the fuel consumption can further be saved in accordance with the thermal load can be realized.

OTHER EMBODIMENT

While the desirable embodiment of the present disclosure is described, the present disclosure is not restricted to the embodiment mentioned, and can be implemented with various modification in the range not deviating from the scope of the present disclosure.

The scope of the present disclosure is not limited to the range exemplified with the structure of the embodiment. The range of the present disclosure is shown by the appended claims, and also includes all the changes in the equivalence.

In the above-described first embodiment, the temperature of the air that has passed through the evaporator for constituting the refrigeration cycle is used as the thermal load. However, the thermal load is not limited to the post-evaporator temperature TE. For example, a sensor for detecting a temperature in the vehicle cabin or a surface temperature of the occupant in the vehicle cabin as the thermal load may be used, and the power saving control may be executed by using these values. In other words, the stability is determined when the thermal load and the refrigeration cycle are balanced in the above-described first embodiment. However, in the case where the sense of warmth of the occupant can directly be detected, such as by an IR sensor, the IR sensor may be used.

In the above-described first embodiment, the case where the air conditioning ECU 18 determines that the air conditioning request is satisfied is the case where the post-evaporator temperature TE falls within a constant range for 30 seconds. However, the case is not limited to what has just been described. For example, the air conditioning ECU 18 may determine that the air conditioning request is satisfied in the case where a degree of change in the thermal load that is detected by the detecting section is at most equal to a specified value. Accordingly, for example, it may be determined as the case where the air conditioning request is satisfied in the case where a degree of change in the post-evaporator temperature TE is at most equal to a predetermined value. In this way, the power saving control can be executed at faster timing. Thus, the power saving effect can further be increased. In other words, also in transition immediately after the activation of the air conditioner 10, the shifting to the stepwise ON/OFF operation may be made when a gradient of change in the vehicle cabin inside temperature is gradual. In this case, the gradient at which the shifting to the ON/OFF may be made in accordance with the thermal load from the outside air temperature, TAO, and the like is preferably prepared as a map in advance.

In the above-described first embodiment, the shifting to the ON/OFF is made during the normal operation. However, the capacity may be lowered to a certain low rotational speed without turning OFF. For example, compared to the ON/OFF in which the reference rotational speed is 2500 rpm and the low rotational speed is 0 rpm, the control may be executed at the reference rotational speed of 2500 rpm and the low rotational speed of 1000 rpm. In this way, the power saving effect is lowered. However, the range where the power saving control can be executed can be expanded for the continuous operation. For example, such control is valid during idling in which the noise of ON/OFF is remarkable.

In the above-described first embodiment, the compressor 11 is electric. However, the present disclosure may be applied to a belt-driven compressor 11. In addition, the power saving effect can further be increased by combining an evaporator that has, for example, a cold storage function and the power saving control.

In the above-described first embodiment, the lower limit control value IVOmin (the reference rotational speed) is set to be the larger value than the target compressor rotational speed IVOn. However, the lower limit control value IVOmin is not limited to the larger value. The reference rotational speed may be a rotational speed within a predetermined range that includes the rotational speed (the target compressor rotational speed IVOn) at which the air conditioning request is satisfied. Accordingly, the reference rotational speed may be the target compressor rotational speed IVOn or may be a smaller value smaller than the target compressor rotational speed IVOn.

What is claimed is:

1. An air conditioner for a vehicle comprising:
a compressor that compresses refrigerant for conditioning air in a vehicle cabin and defines a refrigeration cycle for the vehicle;
a detecting section that detects a thermal load of air-conditioning in the vehicle cabin; and
a control section that controls a rotational speed of the compressor such that the thermal load detected by the detecting section satisfies an air conditioning request in the vehicle cabin, wherein the detecting section detects a post-evaporator temperature that is a temperature of air that has passed through an evaporator of the refrigeration cycle as the thermal load,
the control section determines whether the air conditioning request is satisfied based on a difference between the post-evaporator temperature detected by the detection section and a target post-evaporator temperature that is a target value of the post-evaporator temperature to satisfy the air conditioning request, and
in case where the predetermined air conditioning request is satisfied by controlling the rotational speed of the compressor, the control section periodically switches between a reference rotational speed and a low rotational speed that is lower than the reference rotational speed so as to maintain a state where the air conditioning request is satisfied, the reference rotational speed being a rotational speed within a predetermined range that includes the rotational speed at which the air conditioning, wherein the control section sets a lower limit control value for a target value of the rotational speed of the compressor, and the control section increases the lower limit control value stepwise when a state where the air conditioning request is satisfied continues for a predetermined time period.

2. The air conditioner according to claim 1, wherein the control section determines that the air conditioning request is satisfied when a degree of change in the thermal load detected by the detecting section is lower than or equal to a predetermined value.

3. The air conditioner according to claim 1, wherein the control section periodically switches between a state where the compressor is driven at the reference rotational speed and a state where the compressor is stopped with the low rotational speed of 0 when the air conditioning request is satisfied.

4. The air conditioner according to claim 1, wherein the control section periodically switches between the reference rotational speed and the low rotational speed when a required cooling capacity that is requested for the refrigeration cycle is lower than a predetermined value.

5. The air conditioner according to claim 1, wherein the reference rotational speed is a rotational speed at which a vibration of the compressor and noise from the compressor become lower than predetermined values.

6. The air conditioner according to claim 1, wherein the compressor is an electric compressor.

7. The air conditioner according to claim 1, wherein the control section prohibits a control periodically switching between the reference rotational speed and the low rotational speed, when a target blowoff temperature of the air conditioning is lower than a predetermined value.

8. The air conditioner according to claim 1, wherein the control section increases the lower limit control value stepwise by 100 revolutions per minute.

9. The air conditioner according to claim 1, wherein the control section sets an upper limit control value for a target value of the rotational speed of the compressor such that a vibration of the compressor and noise from the compressor are lower than predetermined values.

* * * * *